United States Patent
Kawauchi

(10) Patent No.: US 8,925,601 B2
(45) Date of Patent: Jan. 6, 2015

(54) PNEUMATIC TIRE

(75) Inventor: Yasunori Kawauchi, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 486 days.

(21) Appl. No.: 13/238,049

(22) Filed: Sep. 21, 2011

(65) Prior Publication Data

US 2012/0073715 A1 Mar. 29, 2012

(30) Foreign Application Priority Data

Sep. 27, 2010 (JP) .................................. 2010-215638

(51) Int. Cl.
*B60C 11/11* (2006.01)
*B60C 11/03* (2006.01)

(52) U.S. Cl.
CPC ............. *B60C 11/0302* (2013.04); *B60C 11/11* (2013.01); *B60C 2011/0346* (2013.04); *B60C 2011/0381* (2013.04); *B60C 2011/0369* (2013.04); *B60C 2011/0365* (2013.04); *Y10S 152/902* (2013.01); *Y10S 152/03* (2013.01)
USPC ............ 152/209.22; 152/209.16; 152/209.18; 152/902; 152/DIG. 3

(58) Field of Classification Search
CPC ................ B60C 11/0302; B60C 11/11; B60C 2011/0369; B60C 2011/0346; B60C 2011/0381; B60C 11/12; B60C 2011/0365; B60C 2011/0372; B60C 2011/0374; B60C 2011/0376

USPC .................. 152/209.16, 209.18, 902, 209.22, 152/DIG. 3, 209.15; D12/594, 571
IPC ........................................................ B60C 11/11
See application file for complete search history.

(56) References Cited

U.S. PATENT DOCUMENTS

D613,242 S * 4/2010 Izumi ........................... D12/600

* cited by examiner

*Primary Examiner* — Richard Crispino
*Assistant Examiner* — Philip N Schwartz
(74) *Attorney, Agent, or Firm* — Birch, Stewart, Kolasch & Birch, LLP

(57) ABSTRACT

A pneumatic tire comprises a tread portion provided along each tread edge with shoulder blocks defined by a circumferentially extending shoulder main groove and shoulder lateral grooves extending from the shoulder main groove to the tread edge. The shoulder main groove is made up of groove segments curved convexly toward the tire equator so that each groove segment comprises a first inclined part and a second inclined part. The shoulder lateral grooves extend at 45 to 90 degrees with respect to the tire circumferential direction, and are coupled with the first inclined parts of the groove segments. The shoulder blocks are each subdivided by a shoulder sub groove extending at an angle of from 15 to 45 degrees with respect to the tire circumferential direction. The shoulder sub groove has an axially outer end connected with the shoulder lateral groove and an axially inner end coupled with the second inclined part.

9 Claims, 8 Drawing Sheets

PNEUMATIC TIRE

BACKGROUND OF THE INVENTION

The present invention relates to a pneumatic tire, more particularly to an arrangement of grooves and blocks formed in the tread shoulder regions capable of improving drainage performance without sacrificing steering stability and uneven wear resistance.

Pneumatic tires having a block-type tread pattern comprising a plurality of blocks formed in the tread portion are widely used. In order to improve the drainage performance of such a pneumatic tire, water existing between the tread surface and road surface has to be smoothly discharged outside the ground contacting patch from the tread edges.

In order to smoothen the discharge of water from the tread edges, a heretofore widely employed technique is to increase the volume of shoulder lateral grooves opened at the tread edges.

This technique however, inevitably decreases the rigidity of shoulder blocks formed in the tread shoulder regions, therefore, there is a problem such that the steering stability and uneven wear resistance are liable to deteriorate.

Thus, the drainage and the blocks rigidity have an antinomic relationship, and it was difficult to achieve both at the same time.

SUMMARY OF THE INVENTION

The present invention was studied out with the view of the above-mentioned problem, therefore it is an object of the present invention to provide a pneumatic tire in which, essentially the shapes and configurations of main grooves and lateral grooves, which are formed in the tread shoulder regions and thus have a great influence on the drainage, are improved to secure the block rigidity and to improve the drainage without sacrificing the steering stability and uneven wear resistance.

According to the present invention, a pneumatic tire comprises a tread portion provided along each tread edge with shoulder blocks defined by a circumferentially continuously extending shoulder main groove and a plurality of shoulder lateral grooves extending from the shoulder main groove to said tread edge, wherein the shoulder main groove is made up of a plurality of circumferentially arranged groove segments curved convexly toward the tire equator so that each of the groove segments comprises a first inclined part inclined to one axial direction and a second inclined part inclined to the other axial direction, the shoulder lateral grooves each extend at an angle of from 45 to 90 degrees with respect to the tire circumferential direction, and are respectively coupled with the first inclined parts of the groove segments, the shoulder blocks are each subdivided by a shoulder sub groove extending at an angle of from 15 to 45 degrees with respect to the tire circumferential direction, and the shoulder sub groove has an axially outer end connected with one of the shoulder lateral grooves and an axially inner end coupled with one of the second inclined parts.

Therefore, near the vertex of the convex curve of each of the groove segments, the shoulder main groove can increase the axial width of the shoulder block, and the rigidity of the shoulder block is increased. As a result, the deterioration of the steering stability and uneven wear resistance can be avoided.

The curved groove segment can lead discharging water taken up in the vicinity of the above-mentioned vertex to the first inclined part and second inclined part by utilizing rotation of the tire.

Further, as the first inclined parts are coupled with the shoulder lateral grooves, the water in the first inclined parts is smoothly led to the tread edge and discharged.

As the second inclined parts are coupled with the shoulder sub grooves connected to the shoulder lateral grooves, the water in the second inclined parts is smoothly led to the tread edge and discharged. Thus, the drainage performance can be further improved.

Furthermore, as the shoulder sub grooves are inclined at an angle of 15 to 45 degrees, the circumferential rigidity and lateral stiffness (rigidity) of the shoulder blocks can be secured in a well balanced manner, therefore, the steering stability is improved, and uneven wear such as shoulder wear of the tread portion and heel-and-toe wear of the shoulder blocks can be prevented.

In the present invention, it is optional but preferred that the shoulder lateral grooves each have a groove width gradually increasing from the axially inside to the axially outside;

that the width of the shoulder sub groove at its axially outer end is smaller than that at its axially inner end;

that, by the shoulder sub groove, the shoulder block is subdivided into an axially inner part and an axially outer part so that the maximum axial width Wa of the axially outer part is more than 1.0 times and not more than 2.0 times the minimum axial width Wb of the axially outer part;

that the minimum axial width Wb is 0.5 to 2.0 times the width Wc of the axially inner part measured at a circumferential position at which the minimum axial width Wb of the axially outer part occurs;

that the axially outer part is provided with a cutout part formed by partially cutting out the tread edge so that, in the cutout part, the axial outer edge of the axially outer part shifts toward the axially inside from the tread edge, and one end of the cutout part is coupled with the shoulder lateral groove and the other end of the cutout part terminates within the axially outer part;

that the cutout part is formed on the maximum axial width Wa side of the axially outer part;

that the axially outer part is provided in the corner between the cutout part and the shoulder lateral groove with a chamfer; and that the axially inner part has a first region on the first inclined part side of the axially innermost point of the axially inner part and a second region on the second inclined part side of the axially innermost point of the axially inner part, and the second region is provided with a sipe extending from the shoulder main groove toward the tread edge.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The term "groove width" means the width of a groove measured perpendicularly to the longitudinal direction of the groove.

The term "axial width" means the width of the object concerned measured in parallel with the tire axial direction.

DESCRIPTION OF THE PREFERRED EMBODIMENTS

An embodiment of the present invention will now be described in detail in conjunction with the accompanying drawings.

Figure 1:
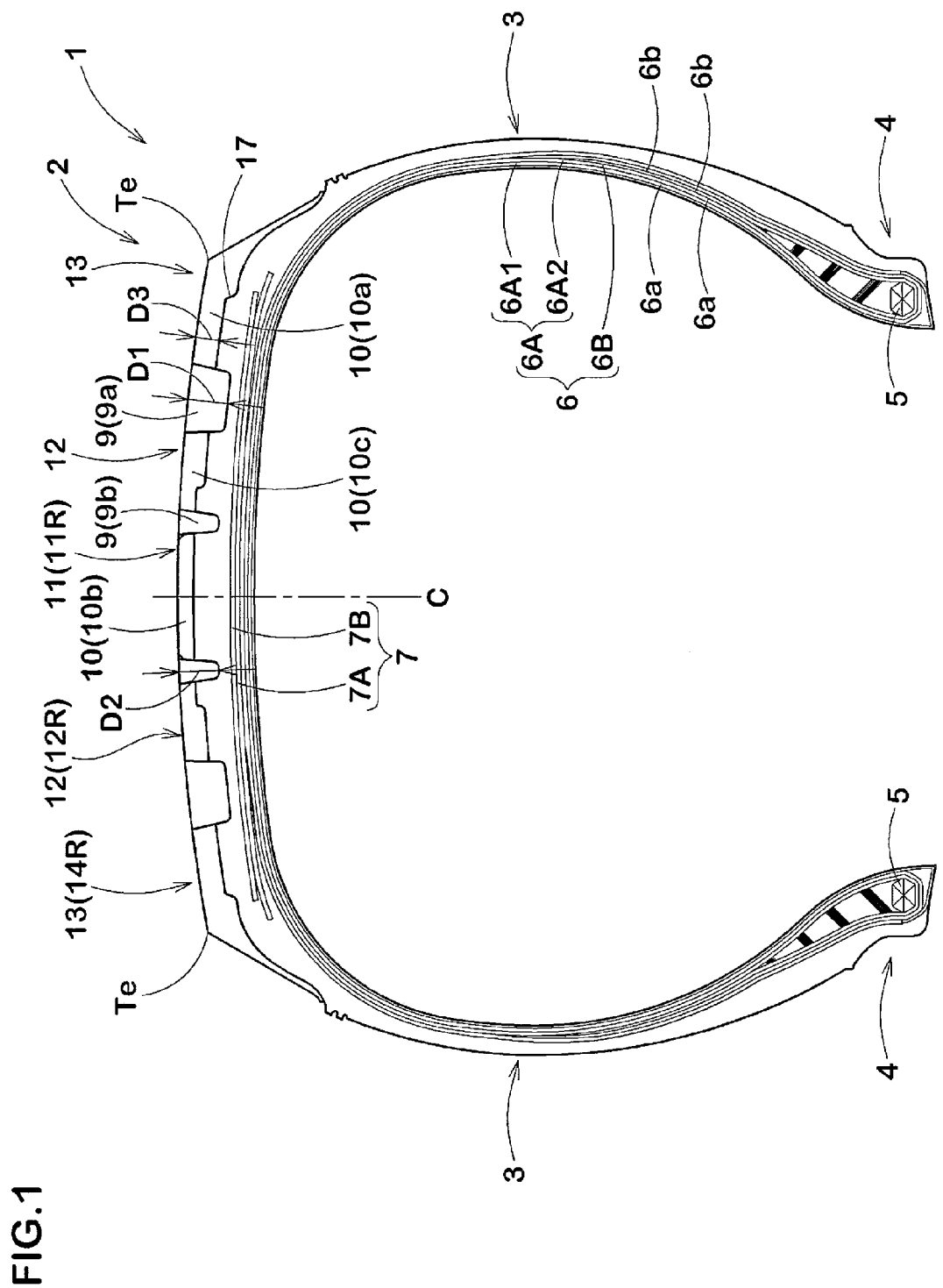
FIG. 1 is a cross sectional view of a pneumatic tire according to an embodiment of the present invention taken along line X-X in FIG. 2.

As shown in FIG. 1, pneumatic tire 1 according to the present invention comprises a tread portion 2, a pair of sidewall portions 3, a pair of bead portions 4 each with a bead core 5 therein, a carcass 6 extending between the bead portions 4 through the tread portion 2 and sidewall portions 3, and a belt layer 7 disposed radially outside the carcass 6 in the tread portion 2.

In this embodiment, the tire is designed for light trucks.

The carcass 6 is composed of two turned-up plies 6A and one nonturned-up ply 6B.

The turned-up plies 6A are an inside turned-up ply 6A1 and an outside turned-up ply 6A2 disposed radially outside the ply 6A1 at the tire equator C.

Each of the turned-up plies 6A1 and 6A2 extends between the bead portions 4 through the tread portion 2 and sidewall portions 3 and is turned up around the bead core 5 in each of the bead portions 4 from the inside to the outside of the tire to form a pair of turned up portions 6b and a toroidal main portion 6a therebetween.

The nonturned-up ply 6B is composed of only the toroidal main portion 6a extending between the bead portions 4 through the tread portion 2 and sidewall portions 3 and disposed on the outside of the turned-up plies.

Each of the plies 6A and 6B is made of carcass cords arranged at an angle of from 75 to 90 degrees with respect to the tire equator C.

For the carcass cords, preferably used are organic fiber cords, e.g. nylon, rayon, aromatic polyamide, polyethylene terephthalate, polyethylene 2.6 naphthalate and the like. However, it is also possible to use steel cords if need arises.

The carcass structure in this embodiment can effectively increase the rigidity from the bead portions to sidewall lower portions to increase the tire stiffness, therefore, this carcass structure is suitable for light trucks used under relatively heavy load conditions.

The belt layer 7 is composed of at least two, in this embodiment only two belt plies, including two cross plies 7A and 7B: a radially inner ply 7A and a radially outer ply 7B. Each ply 7A,7B is made of high elastic modulus belt cords, e.g. steel cords and the like laid parallel with each other at an angle in a range of from 15 to 40 degrees with respect to the tire equator C.

Figure 2:
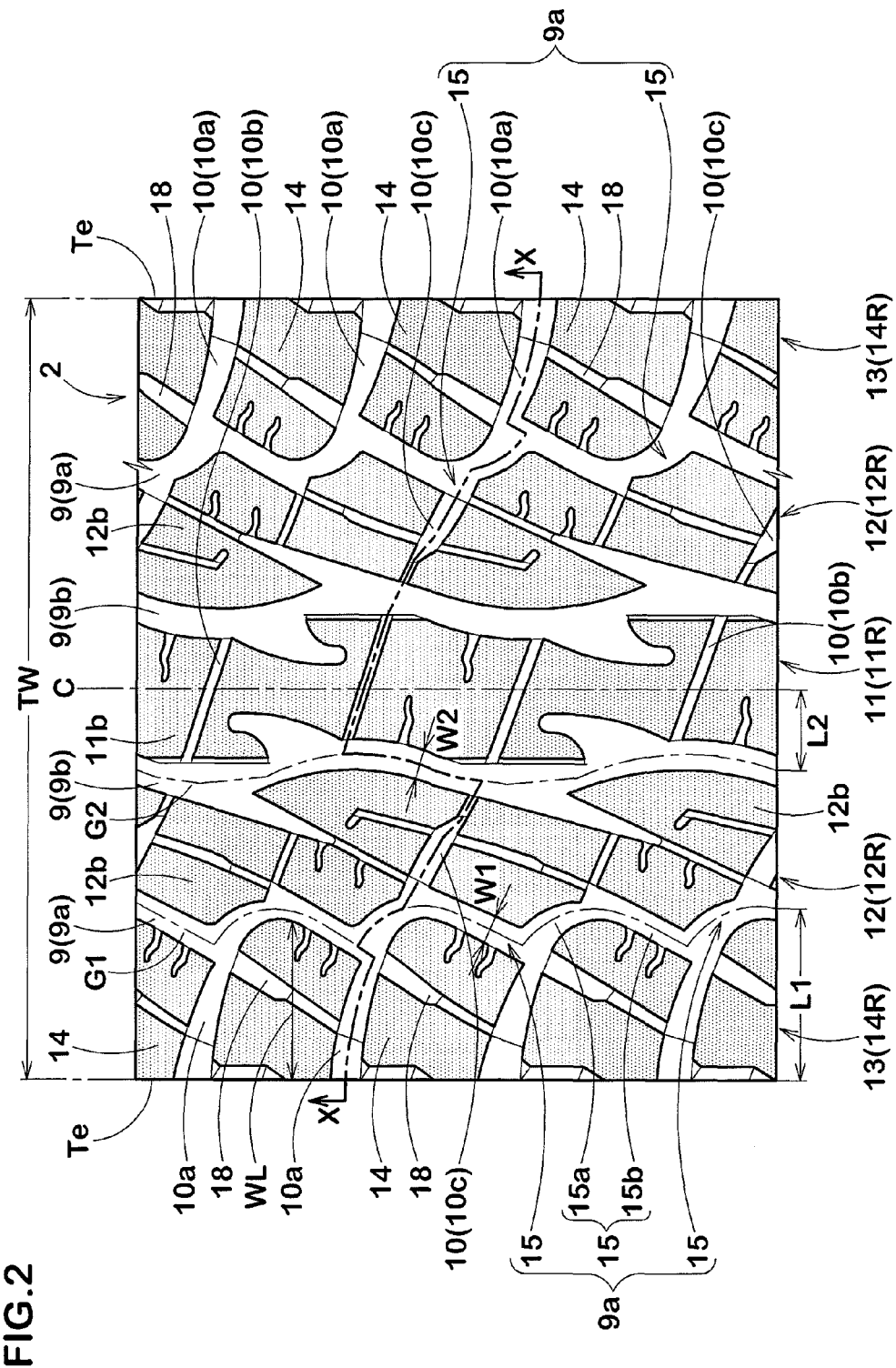
FIG. 2 is a developed partial view of the tread portion of the tire shown in FIG. 1.

In FIG. 2, the tread portion 2 is provided with a tread pattern formed by a plurality of circumferentially continuously extending main grooves 9 and a plurality of lateral grooves 10 extending crosswise to the main grooves 9.

The tread pattern in this embodiment is substantially symmetric with respect to any point on the tire equator C, excepting possible asymmetry occurring when variable pitching is adopted in the arrangement of the tread elements.

In this embodiment, the main grooves 9 include a pair of central main grooves 9b disposed one on each side of the tire equator c, and a pair of shoulder main grooves 9a disposed axially outside the central main grooves 9b, respectively.

Thereby, the tread portion 2 is divided into a central land zone 11 defined between the central main grooves 9b, a pair of middle land zones 12 each defined between one of the central main grooves 9b and the adjacent shoulder main groove 9a, and a pair of shoulder land zones 13 each defined axially outside one of the shoulder main grooves 9a.

In this embodiment, the lateral grooves 10 include central lateral grooves 10b extending across the central land zone 11, middle lateral grooves 10c extending across the middle land zones 12 and shoulder lateral grooves 10a extending from the shoulder main grooves 9a to the tread edges Te across the shoulder land zones 13.

Thereby, the land zones 11, 12 and 13 are divided into one row 11R of circumferentially arranged central blocks 11b, two rows 12R of circumferentially arranged middle blocks 12b and two rows 14R of circumferentially arranged shoulder blocks 14. Incidentally, the shoulder blocks 14 are defined by the shoulder main grooves 9a, shoulder lateral grooves 10a and tread edges Te.

As to the groove widths W1 and W2 and groove depths D1 and D2 of the shoulder main grooves 9a and central main grooves 9b, if the groove widths W1,W2 and/or groove depths D1,D2 are too large, there is a possibility of decreasing in the ground contacting area and the rigidity of the blocks 11b,12b and 14. If too small, there is a possibility that the drainage performance deteriorates. Therefore, it is desirable that the groove width W1,W2 is set in a range of from 3.0 to 8.0% of the tread width TW, and the groove depth D1,D2 is set in a range of from 11.0 to 19.0 mm.

Here, the tread width TW is the axial distance between the tread edges Te measured in the normally inflated unloaded condition of the tire. The tread edges Te are the axial outermost edges of the ground contacting patch (camber angle=0) in the normally inflated loaded condition.

As to the axial positions of the shoulder main groove 9a and central main groove 9b, it is preferable that the axial distance L1 from the tread edge Te to the widthwise center line G1 of the shoulder main groove 9a is set in a range of from 15 to 30% of the tread width TW, and that the axial distance L2 from the tire equator C to the widthwise center line G2 of the central main groove 9b is set in a range of from 7 to 15% of the tread width TW. Thereby, the land zones 11-13 are provided with rigidity in a well balanced manner, and the steering stability and uneven wear resistance can be improved.

In the case that the widthwise center line G1,G2 is not straight, for example a wavy line, the above-mentioned axial distance L1,L2 can be determined based on the amplitude center line.

Figure 3:
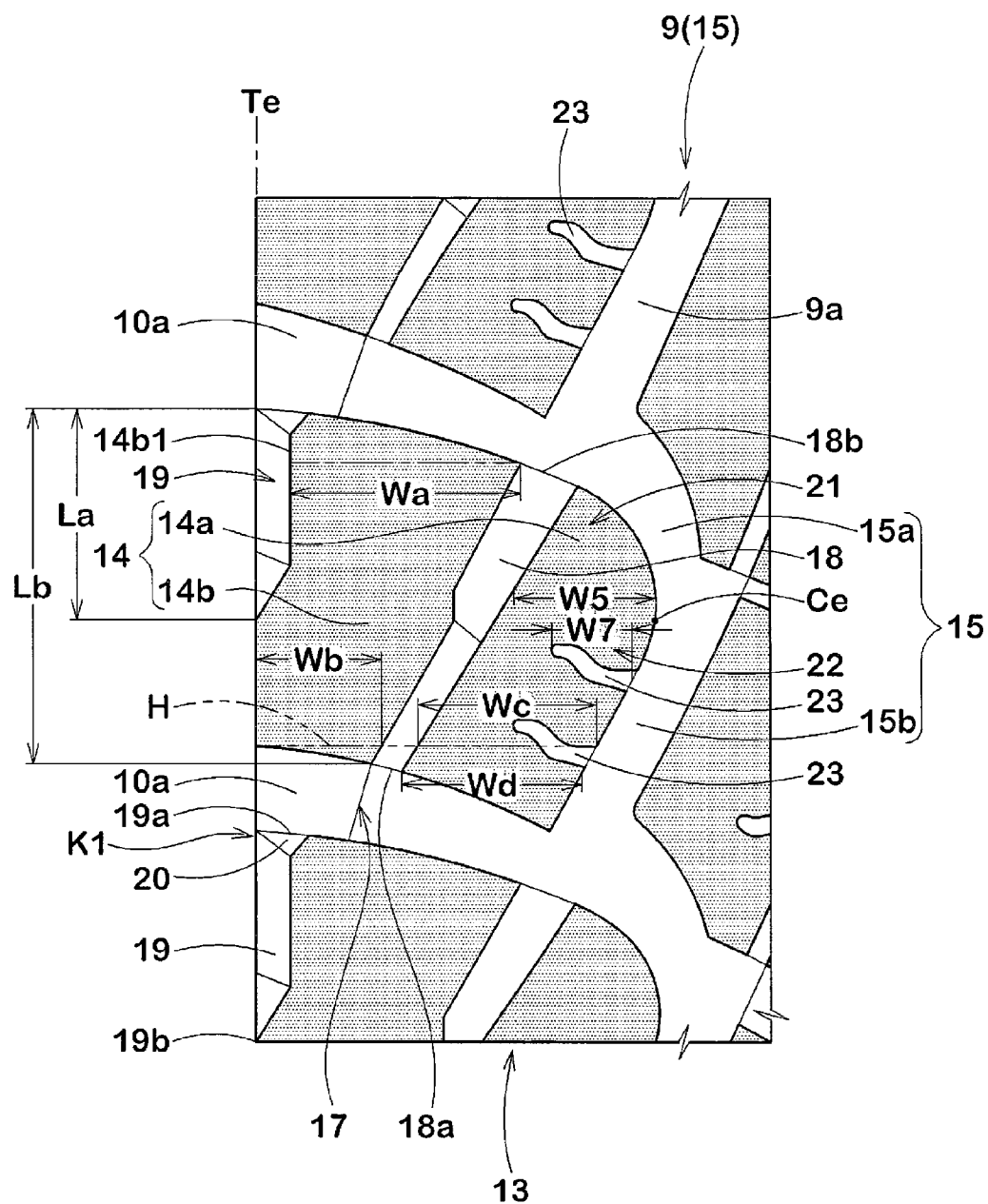
FIG. 3 is an enlarged view of the shoulder block.
Figure 4:
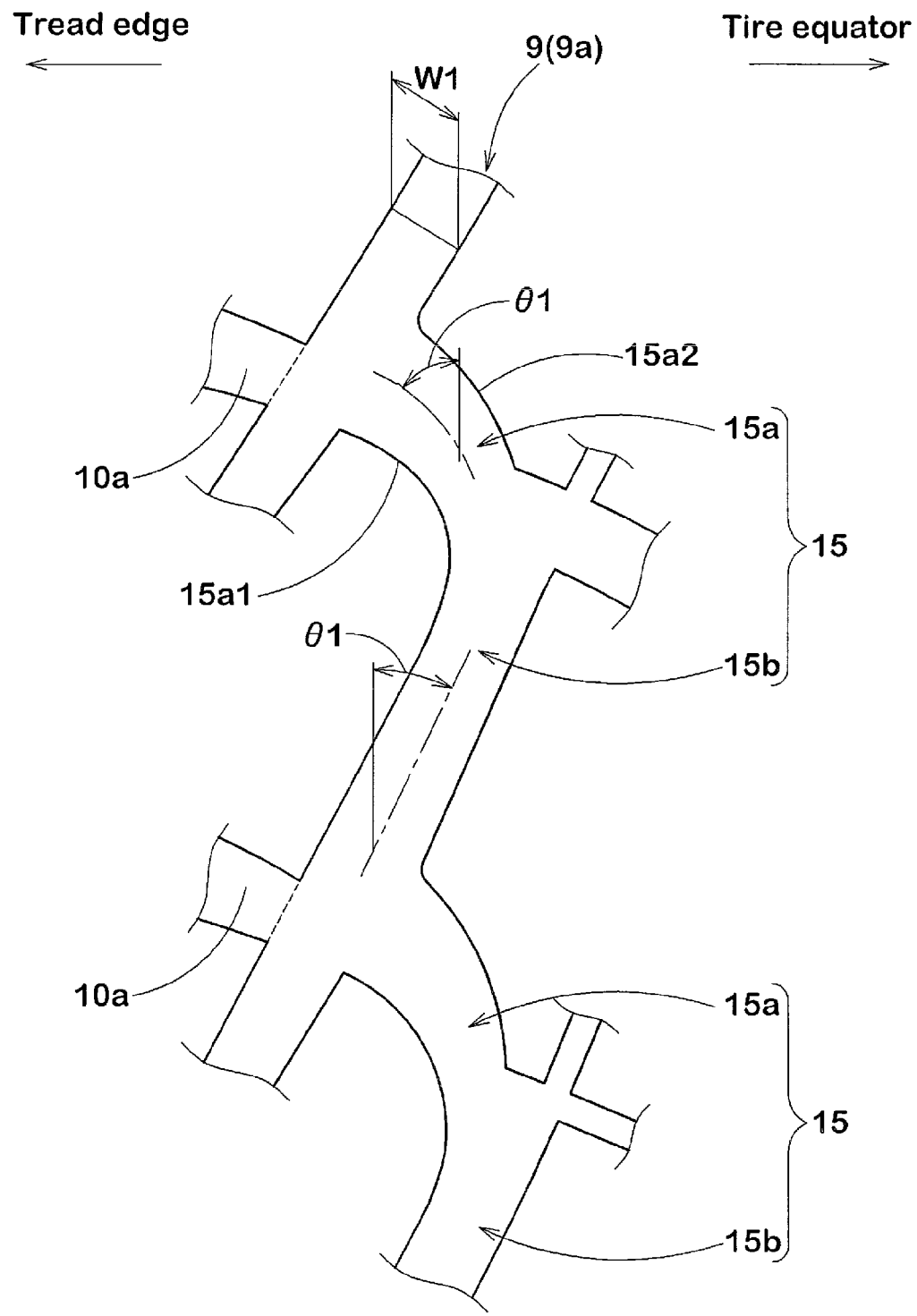
FIG. 4 is an enlarged view of the shoulder main groove.

As shown in FIGS. 3 and 4 enlargedly, the shoulder main groove 9a is made up of circumferentially repeatedly arranged groove segments 15 each smoothly curved convexly toward the tire equator C. In other words, the shoulder main groove 9a is formed by circumferentially repeating the curved groove segment 15 as the minimum repeating unit.

Such shoulder main groove 9a can increase the axial width WL of the shoulder blocks 14 near the vertices of the convex curves of the groove segments 15. Thereby, the shoulder blocks 14 maintain their high rigidity, and the steering stability and uneven wear resistance can be secured.

The curved groove segment 15 has a first inclined part 15a and a second inclined part 15b which are inclined with respect to the tire circumferential direction and smoothly connected with each other through the above-mentioned vertex.

As shown in FIG. 2 (in a half tread portion on the left-hand side of the tire equator C), when viewed from the axially inside toward the axially outside, the first inclined part 15a is inclined to one circumferential direction (in this example, having a left side upward inclination), and the second inclined part 15b is inclined to the other circumferential direction (in this example, having a right side upward inclination).

Such curved groove segment 15 can lead discharging water taken up in the vicinity of the above-mentioned vertex to the first inclined part 15a and/or second inclined part 15b by utilizing rotation of the tire, therefore, the water can be effectively discharged toward the tread edge sides.

In this embodiment, the first inclined part 15a is wholly formed by a smooth arc, but the second inclined part 15b extends substantially straight. Therefore, the curved groove segment 15 in this embodiment is constructed by combining a substantially straight part and an arc part.

The circumferential length of the second inclined part 15b is set to be more than that of the first inclined part 15a.

In comparison with the first inclined part 15a, the second inclined part 15b is decreased in the resistance to the drainage and helps to improve the drainage performance.

As to the angle $\theta 1$ of the curved groove segment 15 with respect to the tire circumferential direction, if the angle $\theta 1$ is decreased, the lateral stiffness (rigidity) of the shoulder blocks 14 becomes decreased, and the steering stability and the resistance to uneven wear especially shoulder wear are liable to deteriorate. If the angle $\theta 1$ is increased, the resistance to the drainage increases, and there is a possibility that the drainage performance is deteriorated.

From this standpoint, it is preferable that the angle $\theta 1$ in the first inclined part 15a especially at the axially outer end and the angle $\theta 1$ in the second inclined part 15b are set in a range of not less than 10 degrees, more preferably not less than 15 degrees, but not more than 60 degrees, more preferably not more than 45 degrees.

Figure 6A:
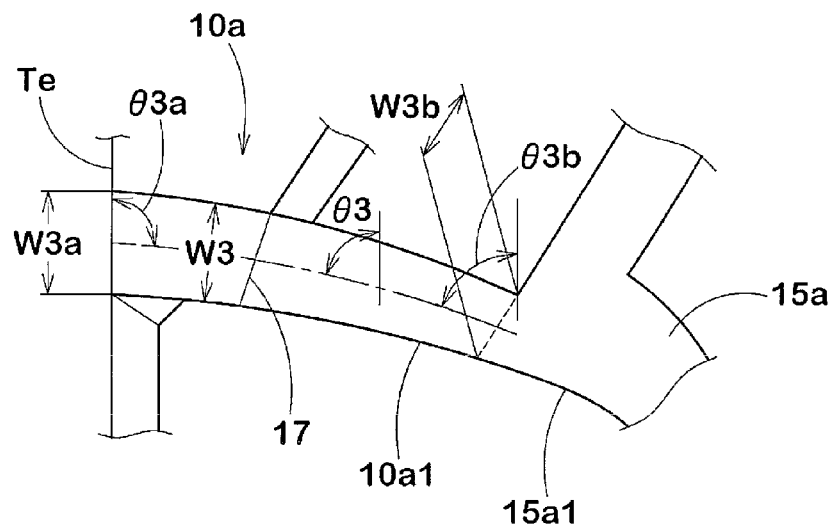
FIG. 6(a) is an enlarged view of the shoulder lateral groove.

As shown in FIG. 3 and FIG. 6(a), the angle $\theta 3$ of the shoulder lateral groove 10a is set to be not less than 45 degrees with respect to the tire circumferential direction, and the inclining direction of the shoulder lateral groove 10a is the same as the first inclined part 15a.

If the angle $\theta 3$ becomes less than 45 degrees, then the lateral stiffness (rigidity) of the shoulder blocks 14 decreases. From this standpoint, the angle $\theta 3$ of the shoulder lateral groove 10a is preferably not less than 55 degrees, more preferably not less than 60 degrees.

On the other hand, if the angle $\theta 3$ exceeds 90 degrees, then the direction becomes reversed, and the resistance to the drainage increases and the drainage performance is deteriorated. From this standpoint, the angle $\theta 3$ is set to be not more than 90 degrees, preferably not more than 85 degrees, more preferably not more than 80 degrees.

The angle $\theta 3$ may be constant. But, in this embodiment, the angle $\theta 3$ is gradually increased toward the axially outside. Thereby, the lateral stiffness (rigidity) is increased in the vicinity of the tread edge Te which is liable to be subjected to a large ground pressure during cornering, and thereby it becomes possible to improve the steering stability and shoulder wear resistance.

The shoulder lateral grooves 10a are coupled with the first inclined parts 15a of the curved groove segments. Thus, the first inclined part 15a continues to the tread edge Te through the shoulder lateral groove 10a in substance. Therefore, utilizing the shoulder lateral groove 10a, the discharging water in the shoulder main groove 9a is smoothly discharged from the first inclined part 15a of the curved groove segment 15 to the outside of the tread edge Te.

Therefore, the pneumatic tire 1 in this embodiment can be further improved in the drainage performance.

In FIG. 6, there is shown an especially preferred mode in which the axially outer groove edge 15a1 of the first inclined part 15a is smoothly continued to the groove edge 10a1 of the shoulder lateral groove 10a. But, the arrangement is not to be limited to this mode.

It is preferable that the groove width W3 of the shoulder lateral groove 10a is gradually increased from the axially inside to the axially outside. Thereby, in the vicinity of the tread edge Te, the drainage is furthered.

The groove width W3a of the shoulder lateral groove 10a at the tread edge Te is preferably set in a range of not less than 105%, more preferably not less than 120%, but not more than 200%, more preferably not more than 180% of the groove width W3b of the shoulder lateral groove 10a at its axially inner end. If the ratio W3a/W3b is increased, the rigidity of the shoulder blocks 14 decreases, and the uneven wear resistance and steering stability deteriorate. If the ratio W3a/W3b is decreased, it becomes difficult to improve the drainage.

In order to effectively obtain the above-mentioned effects, the groove width W3 of the shoulder lateral groove 10a is preferably set in a range of not less than 5.0 mm, more preferably not less than 6.0 mm, but not more than 15.0 mm, more preferably not more than 13.5 mm.

In this embodiment, in order to obtain the rigidity of the shoulder block 14 and the drainage in a well balanced manner, the groove depth D3 of the shoulder lateral groove 10a is preferably set in a range of not less than 50%, more preferably not less than 55%, but not more than 70%, more preferably not more than 65% of the groove depth D1 of the shoulder main groove 9a.

The groove depth of the shoulder lateral groove 10a may be constant. But, for example as shown in FIG. 1 and FIG. 6, it is possible to gradually increase the groove depth D3 toward the tread edge Te forming a step 17. Thereby, the draining water volume is increased on the tread edge side, and a further improvement in the drainage performance is possible.

Figure 6B:
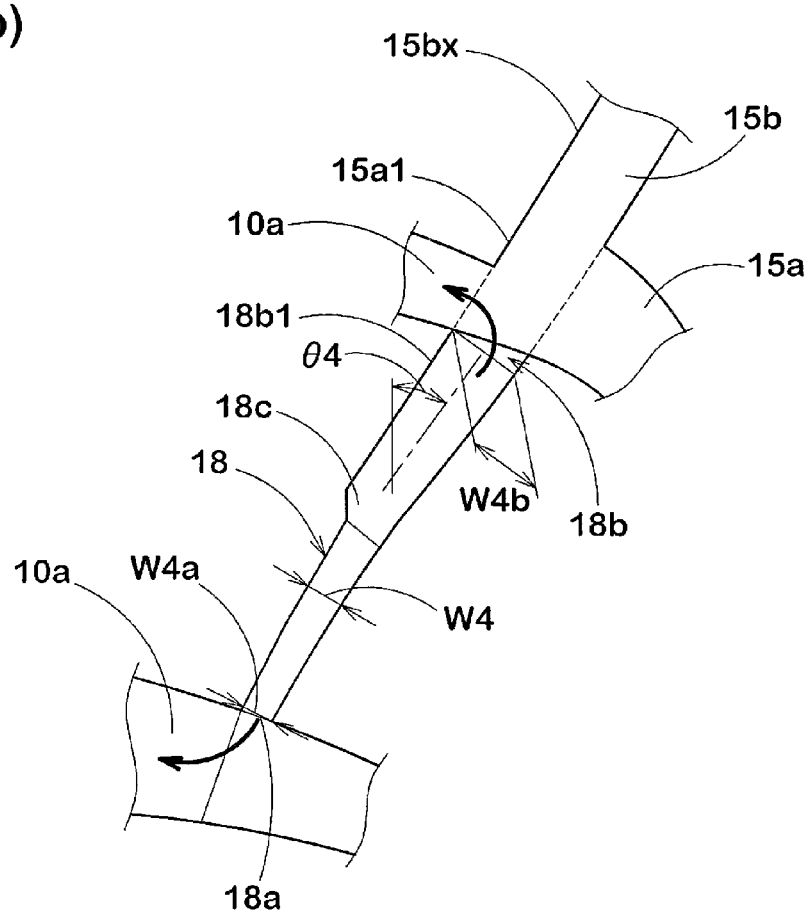
FIG. 6(b) is an enlarged view of the shoulder sub groove.

As shown in FIG. 3 and FIG. 6(b), the shoulder blocks 14 are each provided with a single shoulder sub groove 18 extending substantially straight to subdivide the shoulder block 14 into an axially inner part 14a and an axially outer part 14b.

The angle θ4 of the shoulder sub groove 18 has to be set in a range of from 15 to 45 degrees with respect to the tire circumferential direction.

If the angle θ4 becomes less than 15 degrees, then the travel distance of the draining water to the tread edge Te increases and the draining resistance increases. Thus, the drainage performance is deteriorated. If the angle θ4 exceeds 45 degrees, then the circumferential rigidity of the shoulder block 14 decreases and uneven wear becomes liable to occur.

From this standpoint, the angle θ4 of the shoulder sub groove 18 is more preferably not less than 20 degrees and not more than 40 degrees.

In this embodiment, the axially outer end 18a and axially inner end 18b of the shoulder sub groove 18 are coupled with the shoulder lateral groove 10a and the second inclined part 15b, respectively.

Accordingly, the second inclined part 15b is continued to the shoulder lateral groove 10a through the shoulder sub groove 18. Therefore, the discharging water in the second inclined part 15b smoothly follows to the shoulder sub groove 18 and is discharged outside the tread edge Te through the shoulder lateral groove 10a.

Preferably, the edges 18b1 of the shoulder sub groove 18 are respectively in line with the edges 15bx of the second inclined part 15b.

As explained, in the pneumatic tire in this embodiment, by utilizing the rotation of the tire, the discharging water in the shoulder main groove 9a is discharged outside the tread edge Te by the shoulder main groove 10a through the first inclined part 15a or second inclined part 15b. Therefore, the drainage performance can be greatly improved.

Especially, with respect to the tire circumferential direction, the inclining directions of the shoulder lateral groove 10a and shoulder sub groove 18 are different from each other, therefore, the pneumatic tire 1 of the present invention can exert an excellent drainage performance, regardless of the tire rotational direction.

Further, the angles of the shoulder lateral groove 10a and shoulder sub groove 18 with respect to the tire circumferential direction are respectively limited within the specific ranges as explained above, therefore, the shoulder block 14 is provided with rigidity, and it becomes possible to maintain the steering stability and uneven wear resistance.

As shown in FIG. 6(b), at a substantially intermediate position between 45% and 55% of the circumferential length of the shoulder sub groove 18, the shoulder sub groove 18 in this embodiment is provided with a narrow width part 18c in which its groove width W4 is decreased towards the axially outer end 18a. In the shoulder sub groove 18, therefore, the groove width W4a at the axially outer end 18a becomes smaller than the groove width W4b at the axially inner end 18b.

Such shoulder sub groove 18 can prevent the axial width of the axially outer part 14b from being excessively decreased in a position near the outer end 18a, and the decrease in the lateral stiffness (rigidity) of the axially outer part 14 can be prevented.

On the other hand, near the inner end 18b, a sufficient groove width W4b can be secured to help a smooth drainage. Preferably, the groove width W4a of the shoulder sub groove 18 at the outer end 18a is set in a range of not less than 3.0 mm, more preferably not less than 3.4 mm, but not more than 5.0 mm, more preferably not more than 4.6 mm.

The groove width W4b of the shoulder sub groove 18 at the inner end 18b is preferably set in a range of not less than 6.0 mm, more preferably not less than 6.8 mm, but not more than 10.0 mm, more preferably not more than 9.2 mm.

As shown in FIG. 3, in each of the shoulder blocks 14, the maximum axial width Wa in the axially outer part 14b is preferably set in a range of more than 1.0 times, more preferably not less than 1.15 times, but not more than 2.0 times, more preferably not more than 1.85 times the minimum axial width Wb in the axially outer part 14b.

If the maximum axial width Wa is relatively increased, then the variation in the tire circumferential direction, of the rigidity of the axially outer part 14b increases, and consequently, heel-and-toe wear becomes liable to occur. If the maximum axial width Wa is relatively decreased, the angle θ4 of the shoulder sub groove 18 is decreased, and there is a possibility that the drainage performance deteriorates.

Measured at the circumferential position H at which the minimum axial width Wb of the axially outer part 14b occurs, the minimum axial width Wb is preferably set in a range of not less than 0.5 times, more preferably not less than 0.7 times, but not more than 2.0 times, more preferably not more than 1.8 times the width Wc of the axially inner part 14a.

Figure 7:
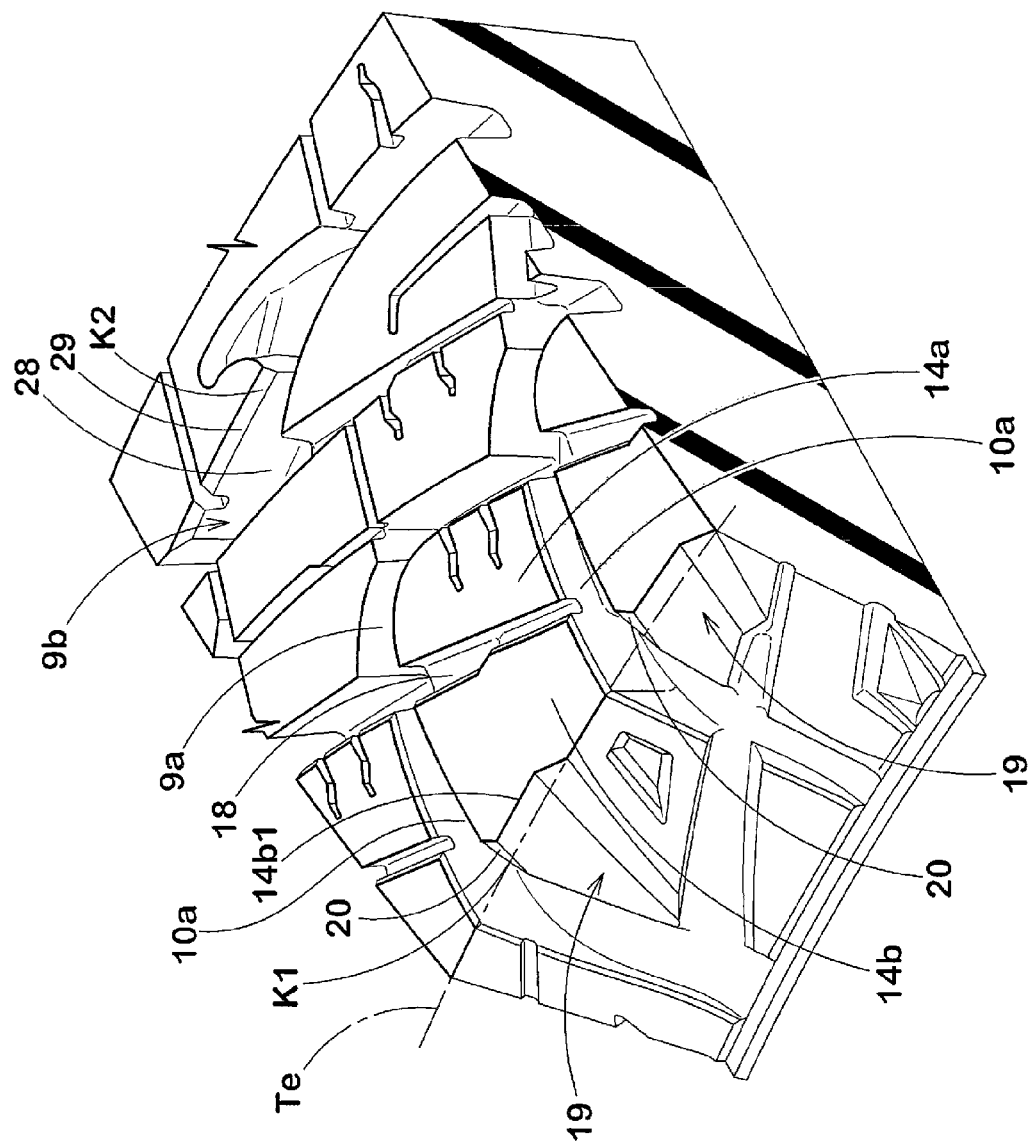
FIG. 7 is a perspective view of a part of the tread portion in this embodiment.

As shown in FIG. 3 and FIG. 7, the axially outer part 14b is preferably provided with a cutout part 19 where the tread edge Te is partially cut out.

In the cutout part 19, the axial outer edge 14b1 of the axially outer part 14b is positioned axially inward of the tread edge Te. Such axially outer part 14b prevents the axial width of the axially outer part 14b from being excessively increased, and the rigidity of the axially outer part 14b is well balanced in the tire circumferential direction, and the occurrence of heel-and-toe wear can be prevented.

It is preferable that one circumferential end 19a of the cutout part 19 is coupled with the shoulder lateral groove 10a, and the other circumferential end 19b terminates within the axially outer part 14b. Such cutout part 19 helps to increase the drainage and uneven wear resistance in a well balanced manner.

It is preferable that the cutout part 19 shifts toward the position at which the maximum axial width Wa of the axially outer part 14b occurs because such arrangement can prevent an excessive increase of the maximum axial width Wa of the axially outer part 14b which is liable to occur due to the inclination of the shoulder sub groove 18, and can control the heel-and-toe wear at the axially outer part 14b.

In order to derive the above-mentioned functions more effectively, the circumferential length La of the cutout part 19 is preferably set in a range of not less than 55%, more preferably not less than 60%, but not more than 75%, more preferably not more than 70% of the circumferential length Lb of the axially outer part 14b.

In this embodiment, as shown in FIG. 3, the axially outer part 14b is provided in the corner K1 between the cutout part 19 and the shoulder lateral groove 10a with a chamfer 20 formed by canting the top surface of the axially outer part 14b so as to have a triangular shape in the top view of the axially outer part 14b. Thereby, the axially outer part 14b provided with such chamfer 20 can improve the uneven wear resistance and steering stability.

The axially inner part 14a of the shoulder block 14 has
a first region 21 formed on the first inclined part 15a side of the axially innermost point Ce and
a second region 22 formed on the second inclined part 15b side of the axially innermost point Ce.

It is desirable that the maximum Wd of the axial width W5 of the axially inner part 14a lies in the second region 22.

Further it is preferable that the second region 22 is provided with sipes 23 extending from the shoulder main groove 9a toward the tread edge Te and terminating therein without reaching to the shoulder sub groove 18.

Such sipes 23 mitigate the rigidity of the second region 22 and decrease the rigidity difference from the first region 21, which helps to make the wear uniform between the regions 21 and 22.

In this embodiment, the second region 22 is provided with two sipes 23, but it is possible to set the number thereof arbitrarily.

In order to obtain the above described function effectively, it is preferable that the sipes 23 has a depth of about 20 to 30% of the depth D1 of the shoulder main groove 9a, a width of about 1.5 to 3.5 mm, and an axial length W7 of about 40 to 60% of the maximum axial width Wd of the axially inner part 14a.

In the present invention, expected is that function to improve the drainage while maintaining the steering stability and uneven wear resistance is achieved by improving the construction of the shoulder regions. Therefore, the central main groove 9b, central blocks 11b, middle blocks 12b and the like may be constructed arbitrarily. But in this embodiment, it is preferred to construct as follows.

Figure 5:
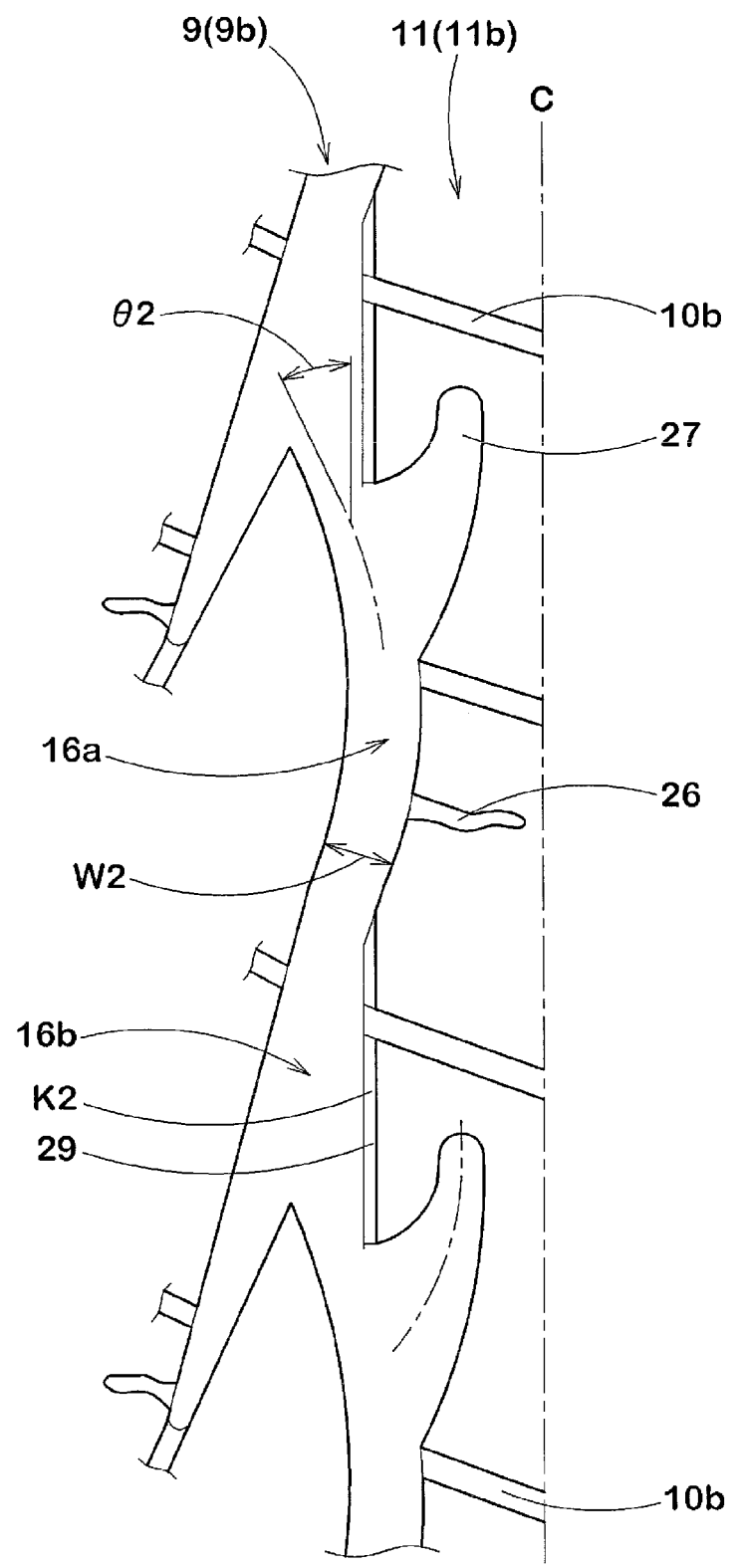
FIG. 5 is an enlarged view of the central main groove.

As shown in FIG. 5, the central main groove 9b comprises alternating curved portions 16a and straight portions 16b.

The curved portion 16a is curved convexly toward the tire equator (in the form of a circular arc in this example). The maximum angle θ2 of the curved portion 16a with respect to the tire circumferential direction is preferably set in a range of about 10 to 30 degrees.

The straight portion 16b has its groove edge on the tire equator side which extends straight in substantially parallel with the tire circumferential direction.

Every two central blocks 11b are each provided with a center lug groove 27 extending from the curved portion 16a towards the tire equator and terminating without reaching to the tire equator. Such center lug groove 27 helps to lead the water existing between the central blocks 11b and the road surface, toward the central main groove 9b, and also helps to control the occurrence of uneven wear of the central blocks 11b by appropriately mitigating the circumferential rigidity of the central blocks 11b.

The edges K2 of the central blocks 11b abutting on the above-mentioned straight portions 16b of the central main groove 9b are provided with chamfer 29 formed by canting the top surface of each central block so that the chamfer 29 has a constant axial width in the plan view thereof.

Such chamfer 29 mitigates the stress concentration occurring at the edge K2 of the central block 11b and helps to increase the uneven wear resistance.

In this embodiment, the central blocks 11b not provided with the center lug groove 27 are each provided with a sipe 26 whose width is smaller than that of the center lug groove 27, for example less than 2 mm.

The sipe 26 extends from the central main groove 9b toward the tire equator and terminates without reaching to the tire equator. Thereby, the rigidity difference between the circumferentially adjacent central blocks 11b is decreased, and the central land zone can secure uneven wear resistance.

Figure 8:
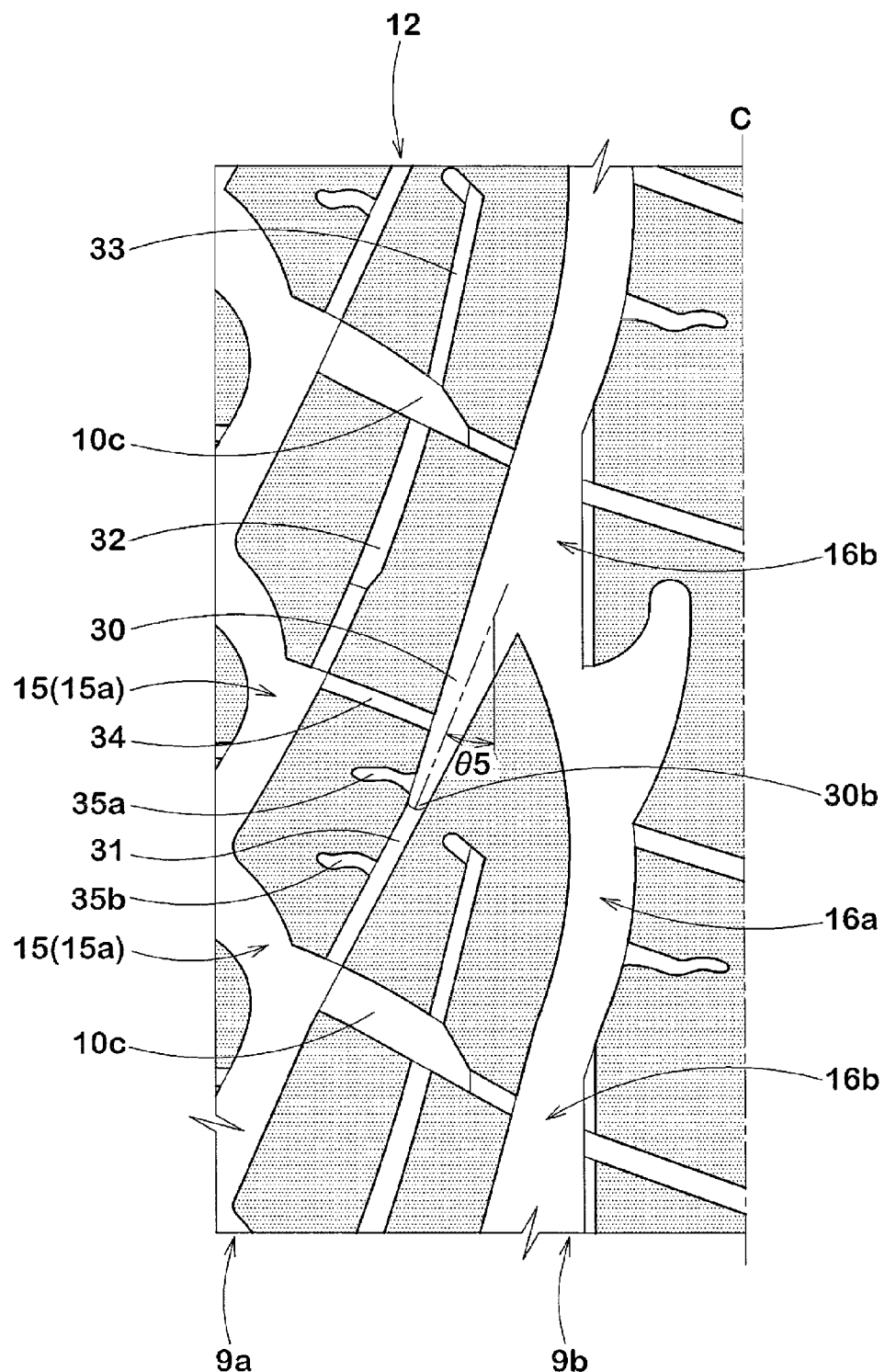
FIG. 8 is an enlarged view of the middle block.

As shown in FIG. 8, the middle land zone 12 is provided with middle lug grooves 30. The middle lug groove 30 extends in a tapered manner from the straight portion 16b of the central main groove 9b, while inclining at an angle θ5 of the 15 to 35 degrees with respect to the tire circumferential direction.

Such middle lug groove 30 smoothly leads the water between the middle blocks 12b and the road surface to the central main groove 9b and helps to secure the rigidity of the middle land zone 12 in a well balanced manner.

The middle blocks 12b is provided with
a first middle longitudinal narrow groove 31 connecting between the curved groove segment 15 and the end 30b of the middle lug groove 30,
a second middle longitudinal narrow groove 32 connecting between the middle lateral groove 10c and the curved groove segment 15,
a third middle longitudinal narrow groove 33 extending from the middle lateral groove 10c toward the middle lug groove 30 and terminating without reaching to the middle lug groove 30,
a middle lateral narrow groove 34 connecting between the middle lug groove 30 and the first inclined part 15a of the curved groove segment 15,
a sipe 35a extending axially outwardly from the middle lug groove 30, and
a sipe 35b extending axially outwardly from the first middle longitudinal narrow groove 31.

Such middle land zone 12 helps to improve the rigidity of the middle block 12b and the drainage in a well balanced manner.

Comparison Tests

In order to confirm the effects of the present invention, pneumatic tires of size LT315/75R16 121S (rim size 16×8.0) having the internal structure shown in FIG. 1 and the specifications shown in Table 1 were prepared and tested for the steering stability, drainage performance, and uneven wear resistance.

All of the test tires had identical specifications except for the specifications shown in Table 1.

The specifications common to all of the test tires are as follows.

<Shoulder Main Groove>
  Groove width W1: 3.0 to 4.5% of tread width TW
  Groove depth D1: 12.8 to 13.2 mm
  Angle θ1: 25 to 35 degrees with respect to tire circumferential direction
  Distance L1: 15 to 25% of TW
<Shoulder Lateral Groove>
  Groove width W3: 10.5 to 11.5 mm
  Groove width W3a: 160 to 180% of Groove width W3b
  Angle θ3: 75 to 85 degrees with respect to tire circumferential direction
  Groove depth D3: 54 to 57% of Groove depth D1 of shoulder main groove
<Shoulder Sub Groove>
  Groove width W4b at inner end: 6.5 to 7.5 mm
  Groove width W4a at outer end: 3.4 to 4.0 mm
  Groove depth: 2.9 to 5.0 mm
<Others>
  Groove width W2 of central main groove: 3.5 to 6.0% of tread width TW Groove depth D2 of central main groove: 12.8 to 13.2 mm
Distance L2: 8 to 12% of TW <Steering Stability Test>

In a tire test course, a 4800 cc 4WD pickup truck provided on the four wheels with test tires was run on a dry asphalt road at 60 km/h, and various lane changes were made repeatedly, and the steering stability was evaluated into five ranks by the test driver. (tire pressure: 275 kPa, tire load: 8.53 kN) The results are indicated in Table 1, wherein the higher the rank number, the better the steering stability.

<Drainage Performance (Wet Braking) Test>

The above-mentioned truck was run on a wet asphalt road covered by water of 4 to 6 mm depth, and braked hard at the running speed of 60 km/h to measure the braking distance.

In Table 1, the reciprocal number of the braking distance is indicated by an index based on the reciprocal number of the braking distance of the comparative example 1 being 100. Thus, the larger the value, the better the drainage performance.

<Uneven Wear Resistance Test>

After running on public roads for 24,000 km with the above-mentioned truck, the test tires were visually checked for uneven wear in the tread shoulder regions and the condition of the uneven wear was evaluated into five ranks.

The results are shown in Table 1, wherein the higher the rank number, the better the uneven wear resistance.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| angle $\theta_4$ (deg.) | 10 | 50 | 30 | 15 | 45 | 30 | 30 | 30 | 30 | 30 |
| Wa/Wb | 1.8 | 1.8 | 1.8 | 1.8 | 1.8 | 0.8 | 1.0 | 1.5 | 2.0 | 2.2 |
| Wb/Wc | 0.7 | 0.7 | 0.7 | 0.7 | 0.7 | 0.7 | 0.7 | 0.7 | 0.7 | 0.7 |
| La/Lb (%) | 65 | 65 | 65 | 65 | 65 | 65 | 65 | 65 | 65 | 65 |
| Steering stability | 3 | 2 | 3 | 3 | 3 | 3 | 3 | 3 | 3 | 3 |
| Drainage | 100 | 125 | 118 | 105 | 119 | 114 | 114 | 114 | 125 | 125 |
| Uneven wear resistance | 4 | 3 | 4 | 4 | 3 | 2 | 3 | 4 | 2 | 1 |

| Tire | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| angle $\theta_4$ (deg.) | 30 | 30 | 30 | 30 | 30 | 30 | 30 | 30 | 30 | 30 |
| Wa/Wb | 1.8 | 1.8 | 1.8 | 1.8 | 1.8 | 1.8 | 1.8 | 1.8 | 1.8 | 1.8 |
| Wb/Wc | 0.3 | 0.5 | 1.3 | 2.0 | 2.2 | 0.7 | 0.7 | 0.7 | 0.7 | 0.7 |
| La/Lb (%) | 65 | 65 | 65 | 65 | 65 | 45 | 80 | 55 | 60 | 70 |
| Steering stability | 2 | 3 | 3 | 3 | 3 | 3 | 2 | 3 | 3 | 3 |
| Drainage | 118 | 118 | 114 | 111 | 111 | 114 | 118 | 118 | 118 | 118 |
| Uneven wear resistance | 2 | 3 | 4 | 4 | 3 | 4 | 3 | 4 | 4 | 4 |

From the test results, it was confirmed that the embodiment tires according to the present invention were improved in the steering stability and uneven wear resistance while maintaining the drainage performance.

The invention claimed is:

1. A pneumatic tire comprising
a tread portion provided along each tread edge with shoulder blocks defined by a circumferentially continuously extending shoulder main groove and a plurality of shoulder lateral grooves extending from the shoulder main groove to said tread edge, wherein
the shoulder main groove is made up of a plurality of circumferentially arranged groove segments curved convexly toward the tire equator so that each of the groove segments comprises a first inclined part inclined to one axial direction and a second inclined part inclined to the other axial direction,
the shoulder lateral grooves each extend at an angle of from 45 to 90 degrees with respect to the tire circumferential direction, and are respectively coupled with the first inclined parts of the groove segments,
the shoulder blocks are each subdivided by a shoulder sub groove,
the shoulder sub groove extends at an angle of from 15 to 45 degrees with respect to the tire circumferential direction, and has an axially outer end connected with one of the shoulder lateral grooves and an axially inner end coupled with one of the second inclined parts to subdivide the shoulder block into an axially inner part and an axially outer part,
the maximum axial width Wa of the axially outer part is more than 1.0 times and not more than 2.0 times the minimum axial width Wb of the axially outer part when measured axially between the axially outer edge of the shoulder sub groove and the axially outer edge of the shoulder block,
the depth of each said shoulder lateral groove is not less than 50% and not more than 70% of the depth of the shoulder main groove, and gradually increases toward the tread edge so as to form a step on the axially outside of said axially outer end of the shoulder sub groove,
each said shoulder lateral groove has opposite edges smoothly curved to have a groove width gradually increasing from the axially inside to the axially outside of the tire, and
a corner of the axially outer part formed between said axially outer edge of the shoulder block and the shoulder lateral groove is provided with a chamfer having a triangular shape in the top view of the axially outer part.

2. The pneumatic tire according to claim 1, wherein the shoulder sub grooves each have a groove width at the outer end which is smaller than that at the inner end.

3. The pneumatic tire according to claim 1, wherein the minimum axial width Wb is 0.5 to 2.0 times the width Wc of the axially inner part measured at a circumferential position at which the minimum axial width Wb of the axially outer part occurs.

4. The pneumatic tire according to claim 3, wherein the axially outer part is provided with a cutout part formed by partially cutting out the tread edge so that, in the cutout part, the axial outer edge of the axially outer part shifts from the tread edge toward the axially inside, and one end of the cutout part is coupled with the shoulder lateral groove and the other end of the cutout part terminates within the axially outer part.

5. The pneumatic tire according to claim 1, wherein
the axially inner part has a first region on the first inclined part side of the axially innermost point of the axially inner part and a second region on the second inclined part side of the axially innermost point of the axially inner part, and
the second region is provided with a sipe extending from the shoulder main groove toward the tread edge.

6. The pneumatic tire according to claim 4, wherein
the cutout part is formed on the maximum axial width Wa side of the axially outer part.

7. The pneumatic tire according to claim 2, wherein
the axially inner part has a first region on the first inclined part side of the axially innermost point of the axially inner part and a second region on the second inclined part side of the axially innermost point of the axially inner part, and
the second region is provided with a sipe extending from the shoulder main groove toward the tread edge.

8. The pneumatic tire according to claim 3, wherein
the axially inner part has a first region on the first inclined part side of the axially innermost point of the axially inner part and a second region on the second inclined part side of the axially innermost point of the axially inner part, and
the second region is provided with a sipe extending from the shoulder main groove toward the tread edge.

9. The pneumatic tire according to claim 6, wherein
the axially inner part has a first region on the first inclined part side of the axially innermost point of the axially inner part and a second region on the second inclined part side of the axially innermost point of the axially inner part, and
the second region is provided with a sipe extending from the shoulder main groove toward the tread edge.

* * * * *